Sept. 27, 1966    L. M. JOLLS    3,274,762
MOUNTING FOR MOWER ATTACHMENT
Filed Dec. 5, 1963    3 Sheets-Sheet 3

INVENTOR
LEWIS M. JOLLS
BY Ross M. Campbell

United States Patent Office 3,274,762
Patented Sept. 27, 1966

3,274,762
MOUNTING FOR MOWER ATTACHMENT
Lewis M. Jolls, 602 Walnut St., Brighton, Mich.; Ilene Timmons, administratrix of said Lewis M. Jolls, deceased
Filed Dec. 5, 1963, Ser. No. 328,331
1 Claim. (Cl. 56—25.4)

The present invention relates to mountings for mower attachments and more particularly to improved means for adjustably mounting a mower attachment upon a vehicle.

An object of the invention is to provide improved means for adjustably supporting a mower attachment upon a vehicle.

Another object of the invention is to provide improved horizontally and vertically adjustable means for mounting a mower attachment upon a vehicle.

A further object of the invention is to provide improved means for pivotally connecting mower attachment mounting means to a vehicle.

Still a further object is to provide for a mower attachment improved mounting means adapted to permit extension, withdrawal, elevation and depression additional to that permitted by the mower attachment itself.

The above and other objects of the invention which will later become apparent as the following description proceeds, are attained by the present invention, a preferred embodiment of which has been illustrated, by way of example only, in the accompanying drawings, forming a part of this specification in which like characters are employed to designate like parts throughout the same, and wherein.

Figure 1:
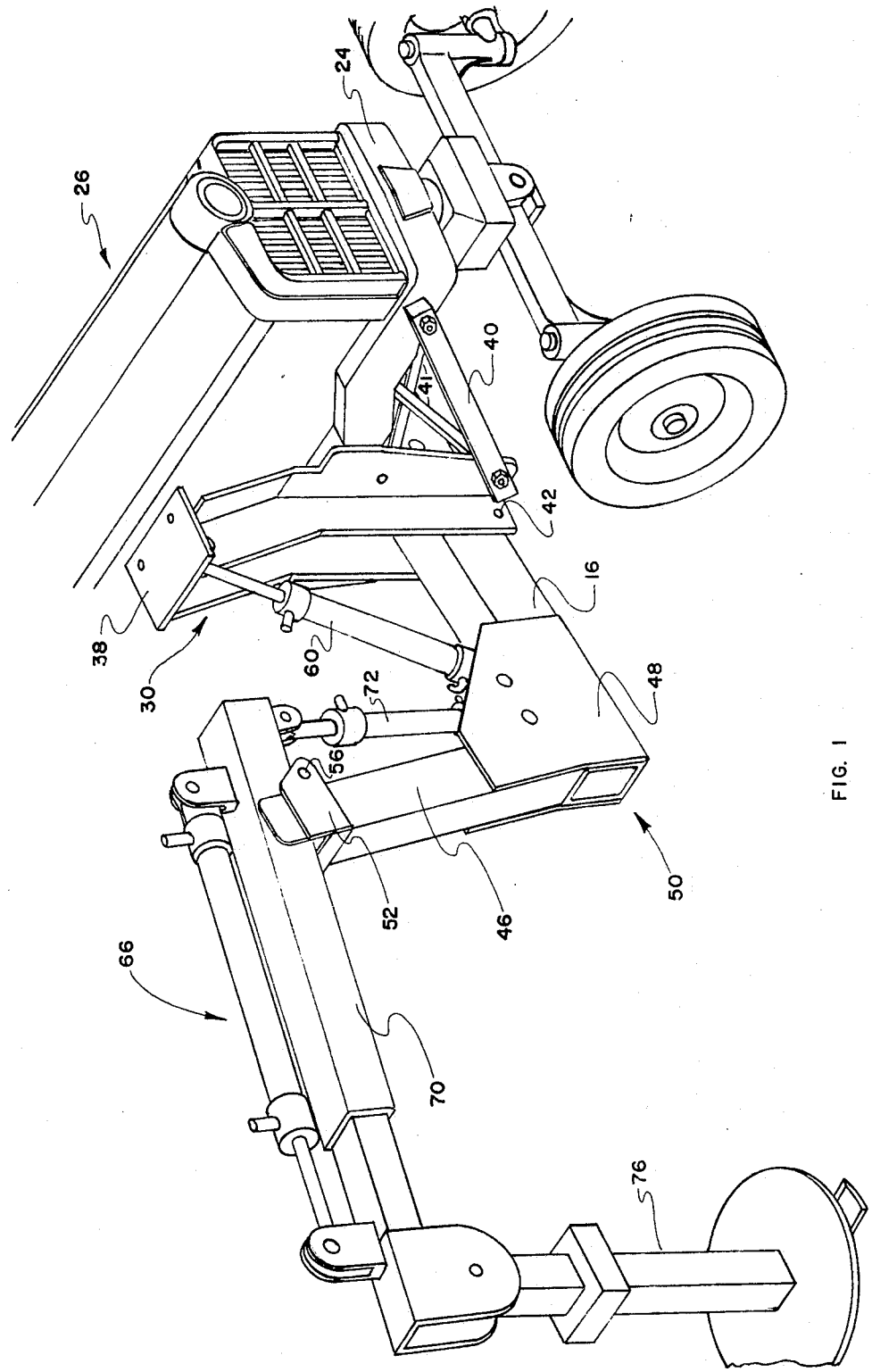
FIGURE 1 is a perspective view of a portion of a tractor bearing a mounting for a mower attachment and a mower attachment supported thereby.

Referring now more particularly to the drawings, I provide an adjustable vertical bracket generally indicated at 10 and formed from a pair of angle irons 12 and 14 of substantial size. Angle irons 12 and 14 are disposed in a vertical, spaced, symmetrical arrangement, the opposing flanges thereof being parallel and spaced apart a distance such as to slidingly receive therebetween a horizontal beam 16 more particularly hereinafter described, in which position they are rigidly interconnected by a plate 18 welded thereto.

A plurality of parallel holes 20 are drilled through the lower portion of the parallel flanges of bracket 10 to accommodate a removable pin 22. The perimeters of the co-planar flanges of angle irons 12 and 14 are so shaped as to accommodate bracket 10 in a vertical position against the left side of the frame 24 of a conventional tractor 26, where with the lower portion of the bracket, containing holes 20, extending below the vehicle, in which position it is bolted securely to the frame by a plurality of bolt and nut combinations 28.

Figure 2:
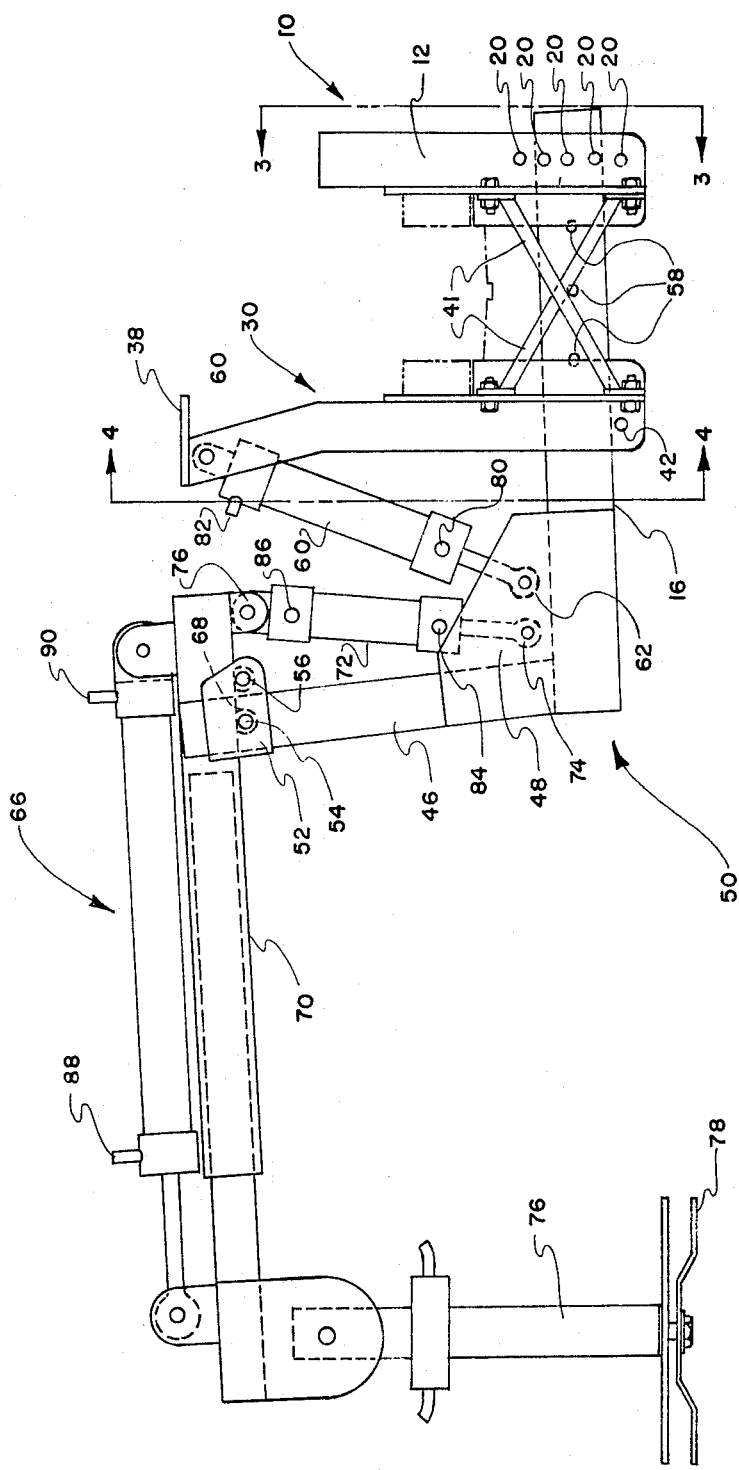
FIGURE 2 is a front elevation of a mounting for a mower attachment and a mower attachment supported thereby.
Figure 3:
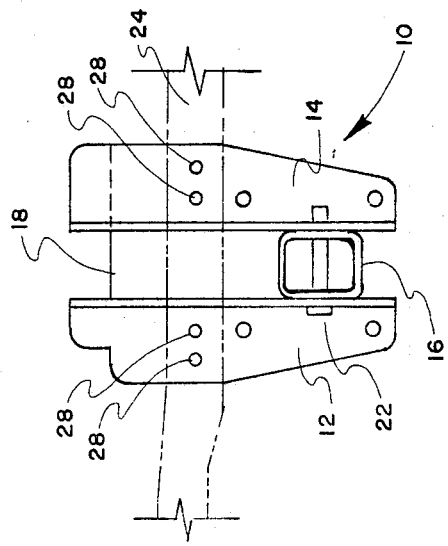
FIGURE 3 is a side elevation of an adjustable vertical bracket taken as along line 3—3 of FIGURE 2.
Figure 4:
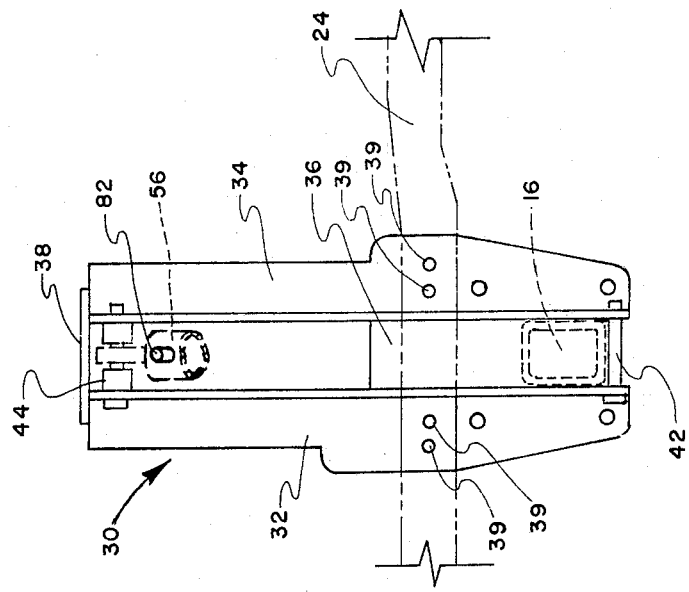
FIGURE 4 is a side elevation of a vertical guide bracket taken as along line 4—4 of FIGURE 2.

A vertical guide bracket generally indicated at 30 is similarly formed from a pair of angle irons 32 and 34 which are interconnected by a plate 36 and, in addition, bears at the top thereof a control support plate 38. The opposing flanges of angle irons 30 and 32 are parallel and spaced apart a distance such as to slidingly receive beam 16 therebetween. The upper portion of bracket 30 is bent slightly forward, as best shown in FIGURE 2, and the perimeters of the co-planar flanges of angle irons 32 and 34 are shaped to accommodate the bracket in a vertical position against the right side of frame 24 and with the lower portion of the bracket extending below the frame parallel and opposite to bracket 10. Bracket 30 is bolted securely to frame 24 in such position by a plurality of nut and bolt combinations 39. A brace 40, formed on one inch steel stock, is bolted to the lower end of bracket 30 and to the forward portion of frame 24, to provide additional support for the bracket against forward and backward stresses. When brackets 10 and 30 have been mounted on their respective sides of frame 24, a pair of diagonal cross braces, 41, 41, formed of one inch steel stock, are bolted therebetween, as best shown in FIGURE 2, to provide additional support thereto against side stresses. A pair of pins 42 and 44 extend transversely through apertures in the lower and upper portions of the parallel flanges of angle irons 30 and 32 for purposes more particularly hereinafter described.

Beam 16 and a post 46 are each formed from hollow, rectangular steel channels and are welded together into a generally L-shaped arrangement to form, together with a corner bracket 48 also welded thereto, a support member generally indicated at 50. I have found it convenient to incline post 46 slightly outwardly, so that it forms a slightly obtuse angle with beam 16 rather than a precise right angle.

A bracket 52 is welded to the upper end of post 46 and is provided with a plurality of pairs of holes 54 therethrough to receive a pin 56. A plurality of holes 58 are also formed in beam 16, near the opposite end thereof, to accommodate pin 22 therethrough.

Beam 16 of support member 50 is inserted between angle irons 32 and 34 of vertical bracket 30, where it rests upon pin 42, and between angle irons 12 and 14 of adjustable vertical bracket 10, so as to extend generally horizontally below frame 24 of tractor 26. A selected hole 58 in beam 16 is then aligned with a selected hole 20 in bracket 10, and a pin 22 is inserted transversely therethrough so as to pivotally connect the left end of beam 16 to bracket 10. Bracket 30 thus provides a vertical guide which permits beam 16, and hence the entire support member 50, to pivot vertically about pin 22 as an axis, while supporting the beam and member against horizontal movement.

A hydraulic actuator 60 is pivotally connected at its lower end to corner bracket 48 by a pin 62 extending transversely therethrough and at its upper end to the upper portion of bracket 30 by a similar pin 64, so as to provide power means for elevating and depressing support member 50 about pin 22 as a pivot.

A mower attachment generally indicated at 66, such as that described in my United States Letters Patent No. 3,058,285, is pivotally connected to the upper end of post 46 between the opposing arms of bracket 52 by pin 56 extending through a sleeve 68 welded to the underside of the main arm 70 of the mower attachment. The lower end of a second hydraulic actuator 72 is pivotally connected to corner bracket 48 by a pin 74, and the upper end thereof is pivotally connected by a pin 76 to a bracket 78 extending downwardly from the inboard end of arm 70, so as to provide power means for elevating and depressing the outer end of the arm about pin 56 as a pivot.

Conventionally hydraulic actuator controls (not shown), mounted upon control support plate 38, and conventional hydraulic lines connected to actuators 60 and 68, are provided to operate the actuators.

In operation, pin 22 is inserted through the desired holes 20 and 58 in bracket 10 and beam 16 so that support member 50 extends outward the desired distance and is supported atop pin 42 at the desired minimum elevation when actuator 60 is fully extended. At the job site, actuator 60 is caused to elevate support member 50 to the desired operative height for the terrain to be traversed. Actuator 72 is then caused to pivotally adjust the position of arm 70 until the cutter bar of the mower attachment is disposed to cut grass, weeds and other vegetation at the desired elevation.

The manner of operation of the mower attachment itself is as described in my aforesaid United States Letters Patent No. 3,058,285.

When it is desired to cut vegetation at an elevation higher than that permitted by contraction of actuator 72, or where tractor 26 must pass closely next to rocks or other obstruction which would strike support member 50, the support member, and hence mower attachment 66 and its cutter bar, may be elevated by contraction of actuator 60, to heights above that permitted by contraction of actuator 72, alone. Conversely, by extending actuator 60 the outer end of support member 50 may be depressed further than permitted by extension of actuator 72 alone, thereby causing the mower attachment to cut vegetation at a lower height, including vegetation growing in depressions in the terrain which supports tractor 26. Upward or downward adjustment of the left end of beam 16 within adjustable bracket 10 by moving pin 22 to a hole 20 at a higher or lower elevation in a bracket will permit even further depression or elevation of the outboard portion of the mower attachment and its cutter bar. Similarly, by horizontal adjustment of beam 16, so that pin 22 extends through a hole 58 closer to or farther from post 46, the mower attachment and its cutter bar may be drawn farther inboard or outboard than permitted by actuator 70 of the mower attachment alone.

It is to be understood that the form of the invention herewith shown and described is to be taken as a preferred embodiment of the same and that resort may be had to various changes in construction without departing from the scope of the subjoined claim.

What is claimed is:

A mounting for a mower attachment on a vehicle having a frame, said attachment having a cutter bar comprising, an elongated beam and an upstanding post forming a generally L-shaped support member, means supported upon said post for pivotally supporting said mower attachment intermediate its ends, a pair of brackets attached to opposite sides of said frame, the lower portions of said brackets extending below said vehicle and being in spaced, parallel relation, means for pivotally supporting the end of said beam remote from said post upon one of said brackets, the other of said brackets disposed to support the end of said beam proximate to said post against horizontal movement but to permit vertical movement thereof, a pair of actuating means each connected at one end to said support member and at the other end, respectively, to the upper portion of said other bracket and to the proximate end of said mower attachment, to adjustably support said mower attachment upon said vehicle.

References Cited by the Examiner

UNITED STATES PATENTS

| | | | |
|---|---|---|---|
| 2,603,930 | 7/1952 | Holmes | 56—25 |
| 2,700,262 | 1/1955 | Goss | 56—25 |
| 2,815,048 | 12/1957 | Davis | 56—25.4 X |
| 2,832,183 | 4/1958 | Pittman | 56—25 |
| 2,997,835 | 8/1961 | Stewart | 56—25 |
| 3,061,996 | 11/1962 | Ripps | 56—25 |
| 3,087,296 | 4/1963 | Cowles | 56—25.4 |

ABRAHAM G. STONE, *Primary Examiner.*

RUSSELL R. KINSEY, *Examiner.*